United States Patent
Hanawa et al.

(10) Patent No.: US 9,333,711 B2
(45) Date of Patent: May 10, 2016

(54) METHOD OF PRODUCING TUBULAR BODY

(71) Applicant: Toray Industries, Inc., Tokyo (JP)

(72) Inventors: Tatsuya Hanawa, Otsu (JP); Kunihiro Mishima, Iyo-gun (JP); Yasushi Iida, Iyo-gun (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/387,570

(22) PCT Filed: Mar. 27, 2013

(86) PCT No.: PCT/JP2013/058913
§ 371 (c)(1),
(2) Date: Sep. 24, 2014

(87) PCT Pub. No.: WO2013/146837
PCT Pub. Date: Oct. 3, 2013

(65) Prior Publication Data
US 2015/0075703 A1 Mar. 19, 2015

(30) Foreign Application Priority Data
Mar. 29, 2012 (JP) ................................. 2012-076586

(51) Int. Cl.
| B29C 53/66 | (2006.01) |
| B29C 70/32 | (2006.01) |
| B29C 70/16 | (2006.01) |
| B29C 53/80 | (2006.01) |
| B29K 105/10 | (2006.01) |
| B29K 263/00 | (2006.01) |
| B29L 23/00 | (2006.01) |

(52) U.S. Cl.
CPC ............... *B29C 70/32* (2013.01); *B29C 53/66* (2013.01); *B29C 53/8016* (2013.01); *B29C 70/16* (2013.01); *B29C 53/665* (2013.01); *B29C 2793/009* (2013.01); *B29K 2105/10* (2013.01); *B29K 2263/00* (2013.01); *B29L 2023/22* (2013.01)

(58) Field of Classification Search
CPC .... B29C 53/60; B29C 53/602; B29C 53/605; B29C 53/62; B29C 53/64; B29C 53/66; B29C 53/665; B29C 53/68; B29C 53/70; F16C 3/026
USPC ................. 156/172, 173, 446–448, 169, 175; 464/181
See application file for complete search history.

(56) References Cited

U.S. PATENT DOCUMENTS

2011/0214773 A1* 9/2011 Hamachi et al. .............. 138/137

FOREIGN PATENT DOCUMENTS

| JP | 03-281228 A | 12/1991 | |
| JP | 03281231 A * | 12/1991 | .............. B29C 67/14 |

(Continued)

*Primary Examiner* — Carson Gross
(74) *Attorney, Agent, or Firm* — DLA Piper LLP (US)

(57) ABSTRACT

A method of producing a tubular body wherein a continuous fiber impregnated with a resin is wound around a mandrel body rotating together with a mandrel shaft section at a predetermined circumferential speed while the continuous fiber is reciprocated in parallel with a rotation axis of the mandrel body, including moving a feed roller that feeds the continuous fiber to the mandrel body without rotating from a middle of the mandrel body to one end of the mandrel body; hooking the continuous fiber by a return section provided at the one end of the mandrel body; winding the continuous fiber on the one end of the mandrel body while a center axis of the feed roller is orthogonal to a feeding direction of the continuous fiber; and rotating the center axis of the feed roller to move the feed roller in a reverse direction.

18 Claims, 4 Drawing Sheets

(56) References Cited

FOREIGN PATENT DOCUMENTS

| JP | 06-026858 B2 | 4/1994 |
| JP | 07-205313 A | 8/1995 |
| JP | 07-205314 A | 8/1995 |
| JP | 2008-535695 A | 9/2008 |
| JP | 2009-051014 A | 3/2009 |

* cited by examiner

METHOD OF PRODUCING TUBULAR BODY

TECHNICAL FIELD

This disclosure relates to a method of producing a tubular body from a reinforcing fiber such as carbon fiber, glass fiber and aramid fiber, by a filament winding method (-"FW method" hereinafter).

BACKGROUND

The FW method, which has advantages capable of enhancing fiber strength and elastic modulus to the maximum and being reliable in an accurate laminating direction, is a method of forming a predetermined shape by impregnating a continuous reinforcing resin ("continuous fiber" hereinafter) with resin as winding the continuous fiber at an arbitrary winding angle around a cylindrical mandrel rotating. Based on characteristics required to a tubular body produced by the FW method, the winding angle (fiber orientation) of fiber with respect to the mandrel should be arbitrarily designed. Therefore, it is desirable that the winding angle is designed arbitrarily between 0° of being parallel with the mandrel axis and 90° of being orthogonal thereto.

In forming a tubular body by the FW method with a cylindrical mandrel, it has been usual that the winding angle is around 30° at the lowest to prevent the fiber yarn from slipping. However, the winding angle is sometimes required to be lower than 30° to give certain characteristics to a product.

To achieve such a low angle, the FW method can be performed as a conventional forming method in which a continuous fiber impregnated with resin is wound around the mandrel shown in FIG. 4(a) of which mandrel body 20 is provided with antislip jigs 21 at which the continuous fiber turns back on both ends as being wound at an appropriate angle. JP-H6-26858-B discloses a technique of a tubular body forming method by the filament winding method, in which forming products are cut at a position of ring-shaped antislip jigs 21, which are fitted on mandrel shaft section 22 and have dry-wooden pins to contact an end of the mandrel body.

In that technique, antislip jig 21 has pins to hook the continuous fiber to be wound so that the continuous fiber is stably wound without slipping regardless of the winding angle. The continuous fiber hooked by the pins turns back and therefore an excessive tension might be caused widthwise to decrease the fiber width of the continuous fiber. To produce a tubular body having a desirable quality by being thermally cured after finishing a winding process, formed products must be cut at considerably inner position from the pins, so that a yield might be worsened.

To solve the problem, a conventional FW method without antislip jigs is known, which enables a low-angle winding together with good yield and good lamination. JP-H3-281228-A discloses a tubular body forming method performed with a mandrel used for the filament winding in which mandrel body 20 on which continuous fiber 23 is directly wound is integrally provided with shaft section 22 having a smaller diameter and step section (shoulder section) 24 on which the continuous fiber is wound between the body section and the shaft section, as shown in FIG. 4(b). It is preferable that the mandrel satisfies Formula (1), where D implies body diameter, d implies shaft diameter and a implies winding angle.

$$\sin \alpha = d/D \quad (1)$$

In this technique, fiber slippage may be a problem specifically if the winding angle α is close to 0° or a surface of the mandrel step section is curved to prevent the continuous fiber from breaking. In addition, a fiber slippage toward the middle of the mandrel may be a problem if the winding angle a increases during winding the fiber on the step section.

To solve the above-described problems of conventional arts, antislip jigs to prevent the continuous fiber from slipping should be provided at both ends of the mandrel to perform a winding stably at any winding angle.

Accordingly, it could be helpful to provide an FW method producing a tubular body, which prevents a yarn width from decreasing at the time of turning back of the continuous fiber, improves a product yield, and enables a low-angle winding under a good lamination, even if the FW method is performed with antislip jigs.

SUMMARY

We thus provide:

(1) A method of producing a tubular body wherein a continuous fiber impregnated with a resin is wound around a mandrel body rotating together with a mandrel shaft section at a predetermined circumferential speed while the continuous fiber is reciprocated in parallel with a rotation axis of the mandrel body, characterized in that a feed roller for feeding the continuous fiber to the mandrel body is moved without rotating from a middle of the mandrel body to one end of the mandrel body, the continuous fiber is hooked by a return section provided at the one end of the mandrel body, the continuous fiber is wound on the one end of the mandrel body while a center axis of the feed roller is orthogonal to a feeding direction of the continuous fiber, and then the center axis of the feed roller is rotated to move the feed roller in a reverse direction.

(2) The method of producing a tubular body according to (1), wherein the continuous fiber is wound on the one end of the mandrel body, while or after the feed roller is moved from the one end of the mandrel body toward the middle of the mandrel body.

(3) The method of producing a tubular body according to (2), wherein the continuous fiber is wound on the one end of the mandrel body after the feed roller is moved from the one end of the mandrel body toward the middle of the mandrel body while the center axis of the feed roller is orthogonal to a feeding direction of the continuous fiber.

(4) The method of producing a tubular body according to (1)-(3), wherein the return section is provided with a plurality of needle-shaped sections of which needle protrudes by a length of 1 to 10% of a diameter of the mandrel body, and protrusion angle θ [°] between a protrusive direction of the needle and the rotation axis of the mandrel body satisfies Conditional Expression (1):

$$0° < \theta < 90° \quad (1).$$

(5) The method of producing a tubular body according to (4), wherein the needle has a diameter of 2 to 5 mm.

(6) The method of producing a tubular body according to (1)-(5), wherein D [mm] as a diameter of the mandrel body and d [mm] as a diameter of the mandrel shaft section satisfy Conditional Expression (2):

$$D/d < 3 \quad (2).$$

(7) The method of producing a tubular body according to (1)-(6), wherein a yield is set to 90% or more by reducing an amount of the fiber wound on the one end of the mandrel body, the yield being defined as a proportion to a fed fiber amount of a fiber amount of a part (product part) having a yarn width of the continuous fiber after being wound on the mandrel body reduced by 10% or less of a yarn width (standard width) of the continuous fiber before being wound on the mandrel body.

In this specification, the "continuous fiber" means a jointless reinforcing fiber fed from a bobbin, including a reinforcing fiber having joints only in dead sections not to be used as a product. It is preferable that the reinforcing fiber is a fiber having a high strength and high elastic modulus to achieve characteristics, such as torsional strength and resonance frequency, which is required for a torque transmission shaft prepared with the tubular body. The reinforcing fiber may be carbon fiber, glass fiber, aramid fiber, boron fiber, ceramic fiber or the like. Different kinds of reinforcing fiber can be mixed.

It is preferable that the "resin" with which the continuous fiber is impregnated is a thermosetting resin such as epoxy resin, unsaturated epoxy resin, phenolic resin and vinylester resin. Above all, the epoxy resin is specifically preferable from viewpoints of good workability and excellent mechanical properties obtained after formation.

The phrase "reciprocated in parallel" means that the continuous fiber is reciprocated as keeping the parallelism between the moving direction of the feed roller and the rotation axis of the mandrel body to wind the continuous fiber on the mandrel body at the same winding angle and the same winding tension. It is preferable that the continuous fiber is reciprocated precisely in parallel. However, the continuous fiber doesn't have to be reciprocated as keeping the moving direction of the feed roller and the rotation axis of the mandrel body in parallel when the continuous fiber is hooked by the return section and is turned back to the reverse direction by rotating the center axis of the feed roller.

The term "orthogonal" means an approximate right angle (90°). It is preferable that an angle between the center axis of the feed roller and the feeding direction of the continuous fiber is within error range of ±5° around 90°. Such an orthogonal condition should be satisfied when the continuous fiber is wound on one end of the mandrel body. On the other hand, the angle may not be orthogonal, while the continuous fiber is hooked by the return section or the center axis of the feed roller is rotated.

To produce a continuous fiber by an FW method, our producing method of a tubular body can prevent the yarn width from reducing at the turn of the continuous fiber, improve the yield and achieve a low winding angle together with a good lamination even if antislip jigs are provided at both ends of the mandrel body for preventing the continuous fiber from slipping.

EXPLANATION OF SYMBOLS

Figure 1:
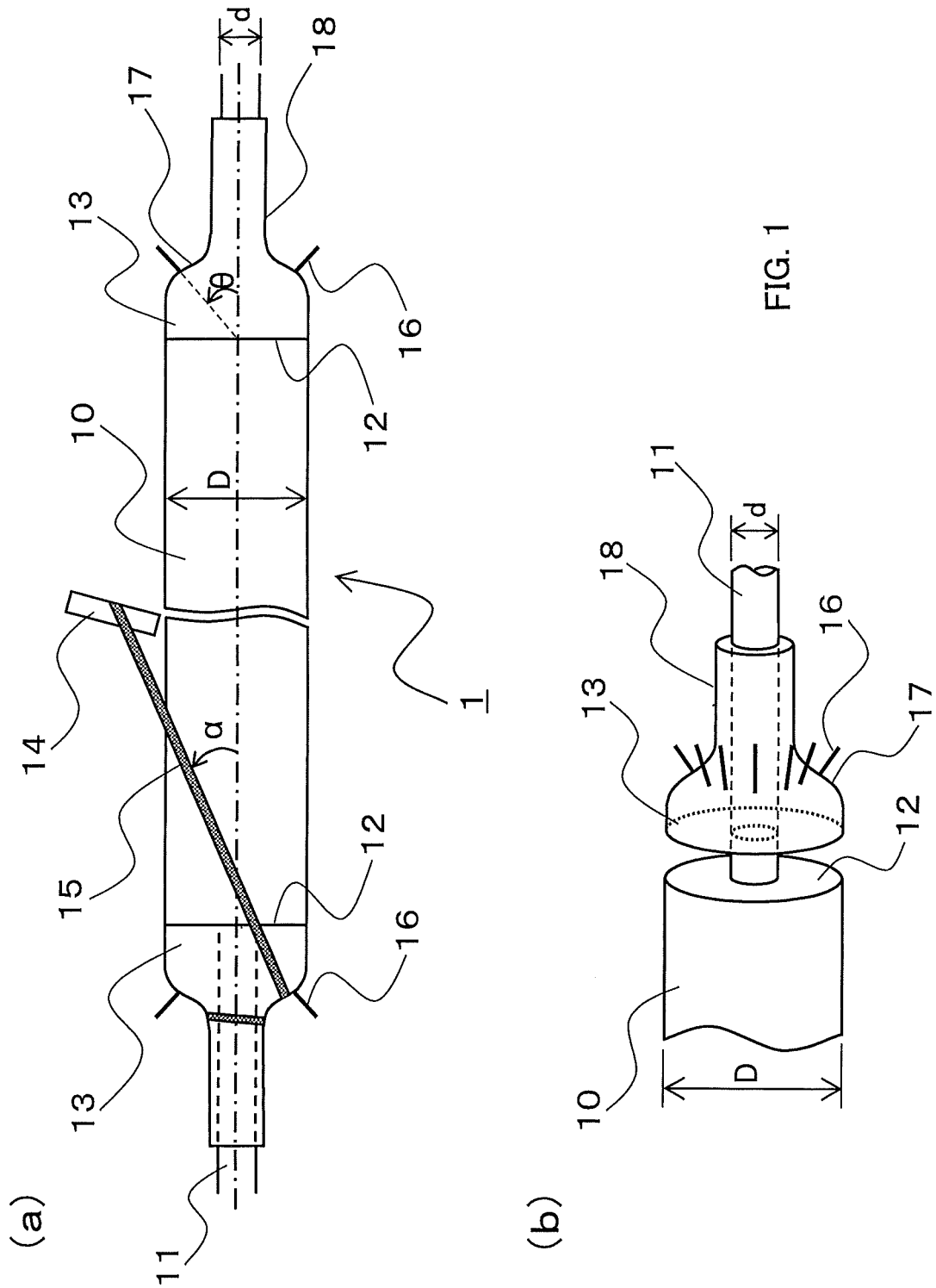
FIG. 1 shows an example of a mandrel used in the present invention, where (a) is a schematic front view and (b) is a schematic perspective view explaining the installation of a return member.

1: mandrel
10: straight section
11: shaft section
12: step section
13: return member
14: feed roller
15: continuous fiber
16: needle-shaped member
17: step section of return member
18: straight section of return member
20: mandrel body
21: antislip jig
22: mandrel shaft section
23: continuous fiber
24: step section (shoulder section)
D: body diameter
d: shaft diameter
L: protrusion length
α: winding angle
θ: protrusion angle

DETAILED DESCRIPTION

Hereinafter, desirable examples of a tubular body producing method will be explained with reference to the figures, specifically in producing a tubular body by the FW method with antislip jigs at both ends of a mandrel body to prevent a continuous fiber from slipping.

FIG. 1(a) is a schematic front view of an example of a mandrel used in a tubular body producing method. FIG. 1(b) is a schematic perspective view explaining the installation of a return member.

FIG. 1(a) shows straight section 10 corresponding to a middle body of mandrel 1 as well as shaft section 11 (rotation axis) provided integrally on both ends of the straight section in an axial direction. Shaft diameter d of shaft section 11 is designed less than body diameter D of straight section 10 so that step section 12 is formed as spacious at an end of straight section 10. FIG. 1(b) shows return member 13 having a hole of the same diameter as shaft diameter d of shaft section 11, where shaft section 11 is installed through the hole at both ends of straight section 10 of mandrel 1. Return material 13 prevents slipping of continuous fiber 15 to be supplied from feed roller 14 and then wound on mandrel 1, comprising step section 17 of return member inclining smoothly, a plurality of needle-shaped member 16 protruding from the step section obliquely to an axial direction of mandrel 1, and straight section 18 of return member having a diameter greater than that of shaft section 11 of mandrel 1. It is preferable that return material 13 is made of a metal such as iron, aluminum, stainless steel and alloy thereof, from viewpoints of handling ability and strength to fix needle-shaped member 16. Alternatively, wood, resin or the like having almost the same strength can be employed.

To perform the FW method with mandrel 1 attaching return member 13, return members 13 are contacted to step section 12 formed at both ends of straight section 10 and then attached thereto to be fixed. After mandrel 1 is attached to an FW apparatus and started to rotate, continuous fiber 15 impregnated with resin is fed from feed roller 14 to be wound at winding angle α. FIG. 1 shows continuous fiber 15 wound on mandrel 1 in which continuous fiber 15 is wound on straight section 10. Once continuous fiber 15 reaches an end of mandrel 1, it goes through between needle-shaped members 16 of return member 13 and then goes through step section 17 of return member 13 so that continuous fiber 15 is wound on straight section 18 of the return member. The continuous fiber goes through between other needle-shaped members and turns back to straight section 10 of mandrel 1, and then goes toward the other return member 13 at the other end to turn back as well. After several sets of such an operation is performed to finish a winding of predetermined winding number and lamination number, thermally-cured resin is released from mandrel 1 to prepare a tubular body.

Needle-shaped member 16 should be a member having a sharp tip capable of easily hooking continuous fiber 15. It is preferable that needle-shaped member 16 has a diameter of 2 to 5 mm, preferably 3 to 4 mm, from viewpoints of preventing frequent replacement of needle-shaped member 16 worn from several times of turns of continuous fiber 15 as well as preventing gaps between continuous fibers 15 wound on mandrel 1 from increasing to decrease a portion available as products. It is preferable that needle-shaped member 16 is made of materials having a strength enough not to bend even if continuous fiber 15 is wound around it by several times. Like return member 13, it is preferable that needle-shaped member 16 is made of a metal such as iron, aluminum, stainless steel and alloy thereof. Alternatively, wood, resin or the like having almost the same strength can be employed. It is preferable that needle-shaped members 16 are disposed to have a pitch of less than or equal to a yarn width of continuous fiber 15, from a viewpoint of preventing continuous fiber 15 from slipping along the mandrel circumference to displace the winding position at the turning back at an end of the mandrel.

Figure 2:
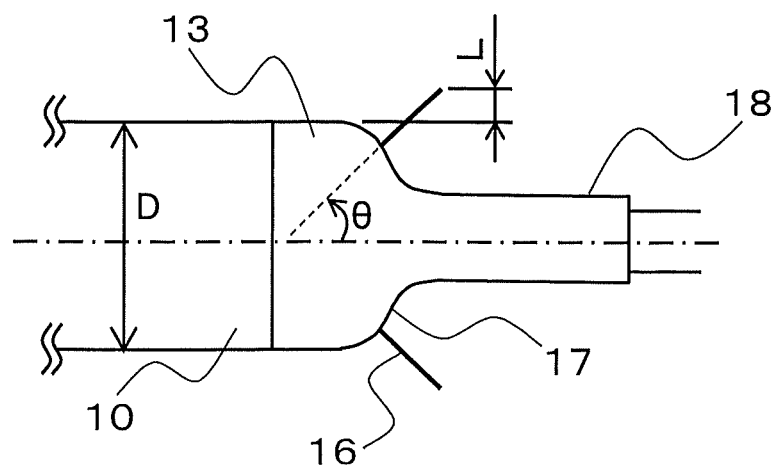
FIG. 2 is a schematic front view of the mandrel explaining a protrusion length of needle of a needle-shaped member.

It is preferable that a protrusion angle $\theta$ [°], which is defined as an angle between a direction of protrusive needle of needle-shaped member 16 and a center axis of the mandrel, is $0° < \theta < 90°$, preferably $30° < \theta < 45°$ to prevent continuous fiber 15 from falling off from needle-shaped member 16 when feed roller 14 rotates and move feed roller 14 closer to mandrel 1 to reduce a free length which is distance from a feeding point of contacting continuous fiber 15 fed by feed roller 14 to the mandrel to rapidly recover a reduced yarn width of continuous fiber 15 hooked by return member 13. From the same viewpoints as above described, it is preferable that a protrusion length L [mm], which is defined as a length of protrusive needle of needle-shaped member 16 as shown in FIG. 2, is 1 to 10% of body diameter D [mm] of straight section 10 of mandrel 1. To move feed roller 14 as close as possible to mandrel 1, it is more preferable that protrusion length L is 1 to 5% of body diameter [mm].

Figure 3:
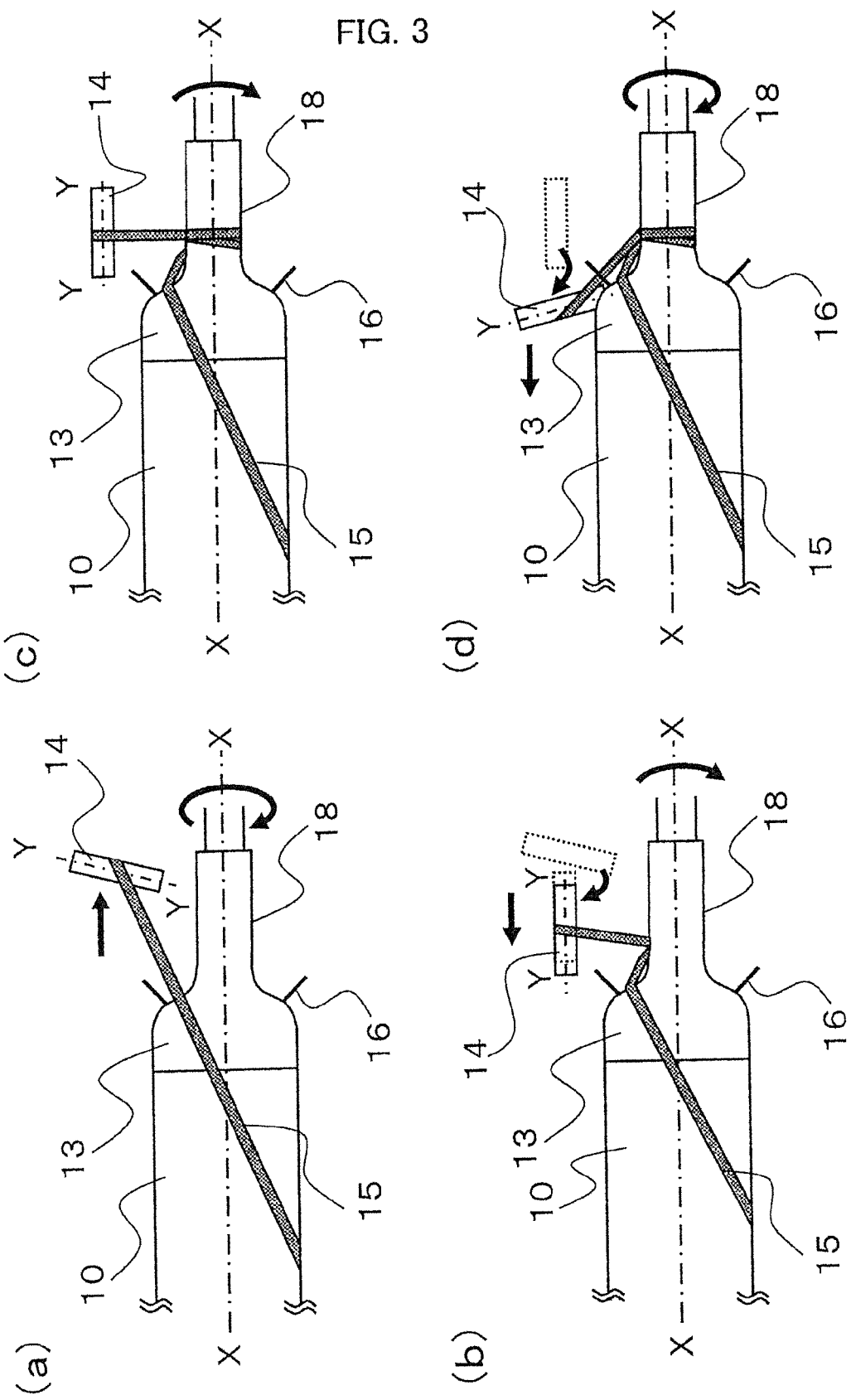
FIGS. 3(a)-(d) are schematic front views of the mandrel sequentially explaining each step (a)-(d) of the turn movement at an end of the mandrel body.
Figure 4:
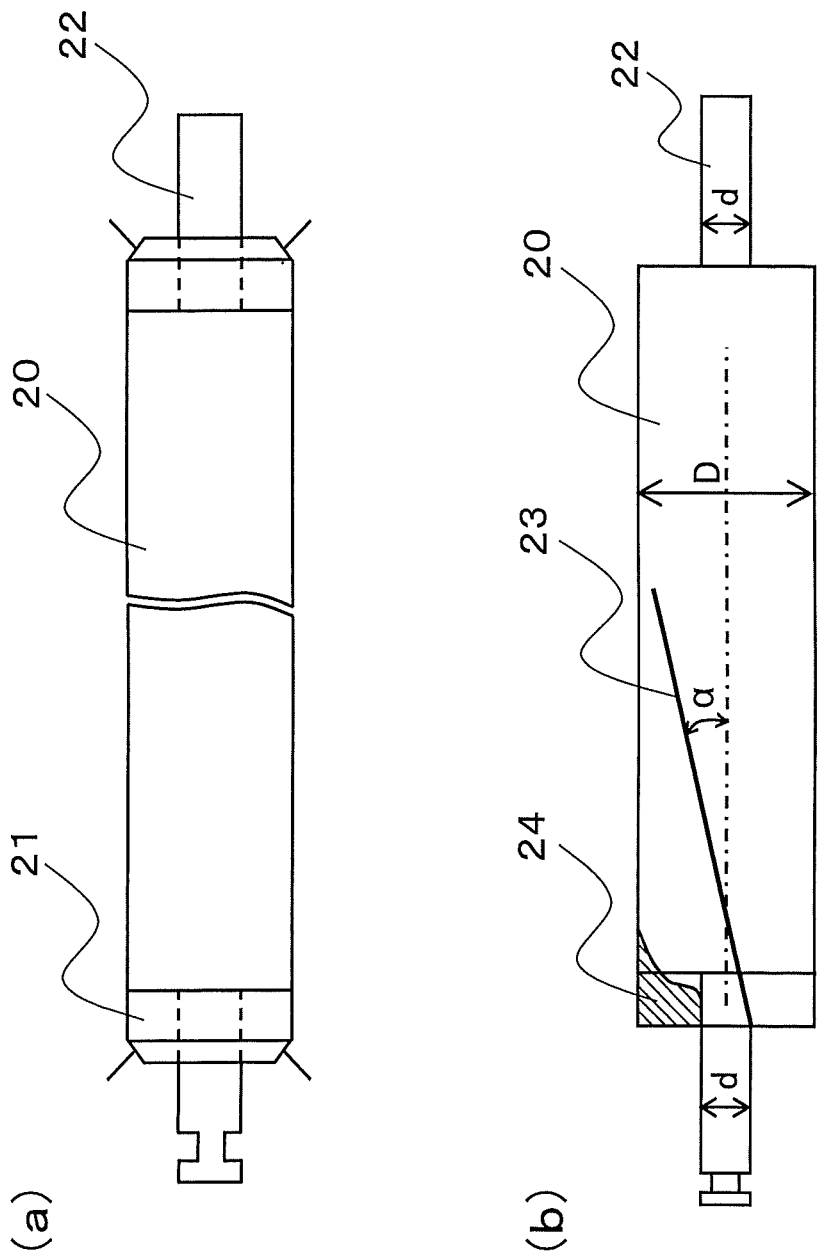
FIGS. 4(a) and (b) are schematic front views of conventional mandrels.

FIG. 3 provides a detailed explanation about a desirable turn to prevent the continuous fiber yarn width from decreasing, improve the yield and perform a winding at a low angle together with a good lamination in the above-described tubular body producing method with mandrel 1.

FIGS. 3(*a*)-(*d*) are schematic front views of the mandrel sequentially explaining each step (a)-(d) of the turn movement at an end of the mandrel.

As shown in FIG. 3(*a*), in winding continuous fiber 15 impregnated with resin on straight section 10 to become a tubular body product, feed roller 14 moves according to a winding speed of mandrel 1 until continuous fiber 15 is hooked by needle-shaped member 16 of return member 13 attached to the end of mandrel, and then mandrel 1 and feed roller 14 are once stopped.

Next, as shown in FIG. 3(*b*), feed roller 14 is rotated until center axis X-X of mandrel 1 becomes in parallel with center axis Y-Y of feed roller 14 while mandrel 1 is rotated to remove a slack of the continuous fiber generated by the rotation of feed roller 14. At the same time, feed roller 14 is moved toward the middle of mandrel 1 by a variation of winding angle $\alpha$. Such a configuration could prevent excessive tension applied to continuous fiber 15 to prevent the continuous fiber width reduction caused by continuous fiber 15 slipping on feed roller 14. In the above-described example, feed roller 14 and mandrel 1 are rotated at the same time of moving feed roller 14 toward the middle of the mandrel. Such a rotation and movement can be performed separately. It is possible that feed roller 14 and mandrel are rotated after feed roller 14 has been moved toward the middle of mandrel 1 or that mandrel 1 is rotated after feed roller 14 is rotated and then moved toward the middle of mandrel 1, or alternatively, that feed roller 14 is moved toward the middle of the mandrel while mandrel 1 is rotated after feed roller 14 is rotated. From the viewpoint of preventing the continuous fiber width reduction, it is preferable that feed roller 14 is moved toward the middle of the mandrel before or while mandrel 1 is rotated.

Next, as shown in FIG. 3(*c*), continuous fiber 15 is wound on straight section 18 of the return member while center axis X-X of feed roller 14 is orthogonal to the feeding direction of the continuous fiber, namely in parallel with center axis Y-Y of feed roller 14. Such a configuration can maintain a broader width of continuous fiber 15 without reducing the width. The winding amount (winding length) of continuous fiber 15 may be determined based on desired winding number. Because the next winding position is predetermined for continuous fiber 15 turning back toward the middle of mandrel 1, the continuous fiber is wound on straight section 18 of the return member by a length corresponding to the displacement of winding position in the past turns. Although continuous fiber 15 may be wound on straight section 18 of the return member by a length corresponding to rotation cycles of mandrel 1 if the winding position is correct at the turn, the yield can be improved effectively by minimizing a fiber amount to be wasted finally if the continuous fiber is wound by a length corresponding to the displacement only.

Finally, as shown in FIG. 3(*d*), feed roller 14 is moved toward the other end according to a winding speed of mandrel 1 after feed roller 14 is rotated to have a winding angle at the other end from the condition where center axis X-X of mandrel 1 is in parallel with center axis Y-Y of feed roller 14. The above-described operations are repeated to perform a winding at desired winding number and lamination number.

In the above-described examples, each step of the turn may be performed either successively or intermittently in each step.

If the relation $D/d \geq 3$ is satisfied, where D [mm] implies body diameter of straight section 10 of mandrel 1 and d [mm] implies shaft diameter of shaft section 11, it is possible that mandrel 1 is not provided with return member 13 because continuous fiber 15 can be wound on step section 12 as maintaining winding angle a without slipping toward the middle of mandrel 1 even if step section (shoulder section) 12 at an end of straight section 10 of mandrel is shaped in a smooth curve to prevent continuous fiber 15 from breaking On the other hand, to produce a thin tubular body with mandrel 1 satisfying the relation $D/d < 3$ suitable for a torque transmission shaft of automobile, ship and helicopter, the above-described producing method could achieve a stable winding at any winding angle as effectively preventing yarn width reduction and improving the yield without slipping of continuous fiber 15 toward the middle of mandrel 1 even if the winding angle $\alpha$ is nearly 0°.

The yield can be calculated as a proportion to the fed continuous fiber amount of a fiber amount of a tubular body product which is a tubular part having a yarn width reduced by 10% or less of a standard width which is a yarn width of continuous fiber 15 to be wound on straight section 10 of mandrel 1. The above-described producing method can achieve a good winding without the continuous fiber yarn width reduction even if a return member having needle-shaped sections is employed so that the amount, which is a fiber amount cut off to be wasted finally, of fiber wound on the ends of the mandrel is reduced to achieve a high yield of 90% or more.

INDUSTRIAL APPLICATIONS

A producing method of a tubular body is applicable to produce any tubular body used as various materials including a torque transmission shaft for vehicles, ships and helicopters.

The invention claimed is:

1. A method of producing a tubular body wherein a continuous fiber impregnated with a resin is wound around a mandrel body rotating together with a mandrel shaft section at a predetermined circumferential speed while the continuous fiber is reciprocated in parallel with a rotation axis of the mandrel body, comprising:
   moving a feed roller that feeds the continuous fiber to the mandrel body without rotating from a middle of the mandrel body to one end of the mandrel body,
   hooking the continuous fiber by a return section provided at the one end of the mandrel body,
   winding the continuous fiber on the one end of the mandrel body while a center axis of the feed roller is orthogonal to a feeding direction of the continuous fiber, and
   rotating the center axis of the feed roller to move the feed roller in a reverse direction.

2. The method according to claim 1, wherein the continuous fiber is wound on the one end of the mandrel body, while or after the feed roller is moved from the one end of the mandrel body toward the middle of the mandrel body.

3. The method according to claim 2, wherein the continuous fiber is wound on the one end of the mandrel body after the feed roller is moved from the one end of the mandrel body toward the middle of the mandrel body while the center axis of the feed roller is orthogonal to a feeding direction of the continuous fiber.

4. The method according to claim 1, wherein the return section is provided with a plurality of needle-shaped sections of which needle protrudes by a length of 1 to 10% of a diameter of the mandrel body, and protrusion angle $\theta[°]$ between a protrusive direction of the needle and the rotation axis of the mandrel body satisfies $0°<\theta<90°$.

5. The method according to claim 4, wherein the needle has a diameter of 2 to 5 mm.

6. The method according to claim 1, wherein D [mm] as a diameter of the mandrel body and d [mm] as a diameter of the mandrel shaft section satisfy D/d<3.

7. The method according to claim 1, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

8. The method according to claim 2, wherein the return section is provided with a plurality of needle-shaped sections of which needle protrudes by a length of 1 to 10% of a diameter of the mandrel body, and protrusion angle $\theta$ [°] between a protrusive direction of the needle and the rotation axis of the mandrel body satisfies $0°<\theta<90°$.

9. The method according to claim 3, wherein the return section is provided with a plurality of needle-shaped sections of which needle protrudes by a length of 1 to 10% of a diameter of the mandrel body, and protrusion angle $\theta$ [°] between a protrusive direction of the needle and the rotation axis of the mandrel body satisfies $0°<\theta<90°$.

10. The method according to claim 2, wherein D [mm] as a diameter of the mandrel body and d [mm] as a diameter of the mandrel shaft section satisfy D/d<3.

11. The method according to claim 3, wherein D [mm] as a diameter of the mandrel body and d [mm] as a diameter of the mandrel shaft section satisfy D/d<3.

12. The method according to claim 4, wherein D [mm] as a diameter of the mandrel body and d [mm] as a diameter of the mandrel shaft section satisfy D/d<3.

13. The method according to claim 5, wherein D [mm] as a diameter of the mandrel body and d [mm] as a diameter of the mandrel shaft section satisfy D/d<3.

14. The method according to claim 2, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

15. The method according to claim 3, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

16. The method according to claim 4, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

17. The method according to claim 5, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

18. The method according to claim 6, wherein a yield is set to 90% or more by reducing an amount of the fiber wound on the one end of the mandrel body, the yield being defined as a proportion to a fed fiber amount of a fiber amount of a part having a yarn width of the continuous fiber after being wound on the mandrel body reduced by 10% or less of a yarn width of the continuous fiber before being wound on the mandrel body.

* * * * *